Oct. 5, 1965
J. D. COLLINS
3,209,851
SUSPENSION SYSTEM AND ENGINE MOUNTING
ARRANGEMENT FOR MOTOR VEHICLES
Filed Nov. 29, 1963
2 Sheets-Sheet 1
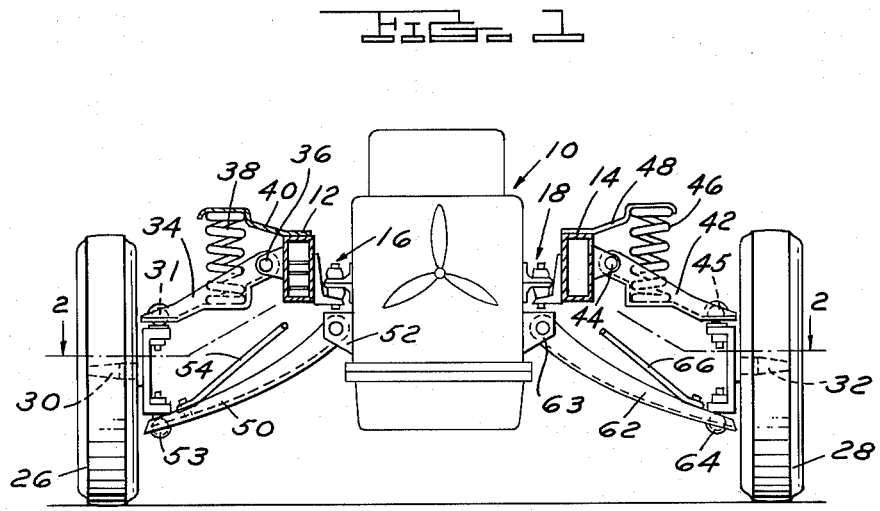
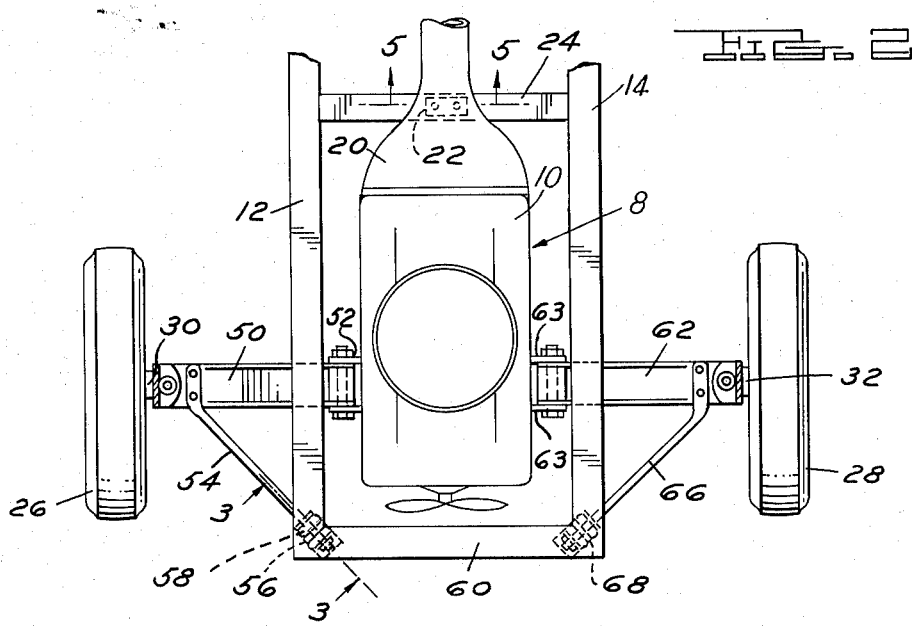
JACK D. COLLINS
INVENTOR.
BY John R. Faulkner
Clifford L. Sadler
ATTORNEYS Oct. 5, 1965 J. D. COLLINS 3,209,851
SUSPENSION SYSTEM AND ENGINE MOUNTING
ARRANGEMENT FOR MOTOR VEHICLES
Filed Nov. 29, 1963 2 Sheets-Sheet 2
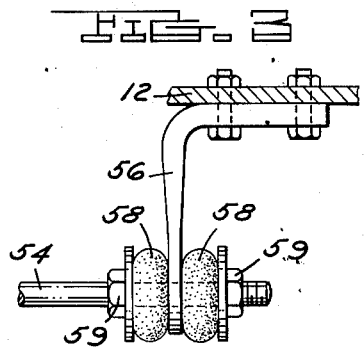
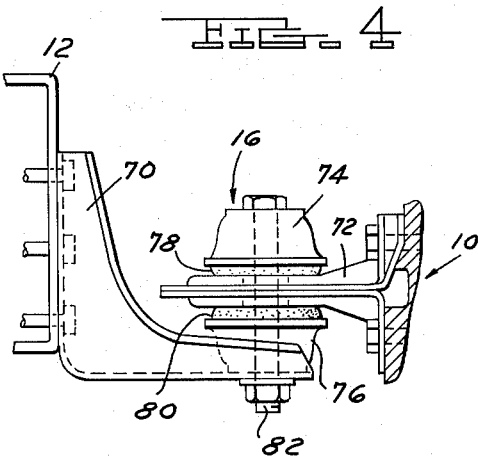
JACK D. COLLINS
INVENTOR.
BY John R. Faulkner
Clifford L. Sadler
ATTORNEYS United States Patent Office 3,209,851
Patented Oct. 5, 1965

3,209,851
SUSPENSION SYSTEM AND ENGINE MOUNTING ARRANGEMENT FOR MOTOR VEHICLES
Jack D. Collins, Dearborn, Mich., assignor to Ford Motor Company, Dearborn, Mich., a corporation of Delaware
Filed Nov. 29, 1963, Ser. No. 326,790
6 Claims. (Cl. 180—42)

The present invention relates generally to motor vehicles, and more particularly to a suspension system and engine mounting arrangement for motor vehicles.

It is the principal object of the present invention to provide a suspension system and engine mounting arrangement for motor vehicles that is characterized by its isolation of road and engine noises and by its reduction of ride harshness.

The present invention is particularly adaptable to independent front suspensions. It is conventional in such suspensions to provide upper and lower control arms for the left and right wheel assembly. These suspension arms are pivotally mounted at their inner ends on the vehicle frame. Unfortunately, with this arrangement road noises are transmitted through the arms to the frame, and from there to the passenger compartment. In view of this adverse result, the present invention provides a unique arrangement in which a portion of the suspension is isolated from the vehicle frame.

In the presently preferred embodiment of the invention, the wheels are mounted on left and right wheel support members. An upper suspension arm extends inwardly from each of the wheel supports to a frame member. The lower suspension arms, instead of being connected to the frame, are pivotally mounted upon the engine. The engine, in turn, is resiliently supported on the frame by special mounts that substantially limit engine movement to a vertical direction only.

In this preferred embodiment, by connecting the lower arms to the engine, road noises are isolated. The resilient engine mounts and the mass of the engine achieve this objective. In the conventional vehicle, the inner ends of both the upper and lower suspension arms are pivotally joined to a common rigid member or to rigidly connected members. According to this invention, however, some relative movement is permitted between the inner pivots of the upper and lower arms. With engine movement being limited by special mounts to a vertical direction, the stability of the wheels is not significantly affected. In other words, normal vibration of the engine will not cause the lower arms and wheels to move so as to adversely affect the steering of the vehicle.

The many advantages of the present invention will be fully appreciated from the following description when considered in connection with the accompanying drawings, in which:

FIGURE 1 is a front elevational view partly in section of a vehicle embodying the present invention;

FIGURE 2 is a top plan view of the suspension and motor mounting arrangement disclosed in FIGURE 1;

FIGURE 3 is an elevational view taken along section lines 3—3 of FIGURE 2;

FIGURE 4 is an enlarged view of one of the forward engine mounts shown in FIGURE 1; and FIGURE 5 is a view partly in section of the rear engine mount.

Referring now to the drawings, FIGURE 1 discloses a portion of a motor vehicle having a power plant 8 that includes a conventional automotive engine 10. The engine 10 is supported on vehicle frame side rails 12 and 14 by left and right engine mounts 16 and 18. The engine mounts 16, 18 are in lateral alignment and longitudinally positioned approximately centrally of the engine 10 in the plan view.

As seen in FIGURE 2, the power plant 8 also includes a clutch and transmission assembly 20 that is connected to the rear of the engine 10. A resilient mount 22 supports the clutch and transmission assembly 20 upon a frame cross member 24 that joins the left and right frame side rails 12 and 14. Forward mounts 16, 18 and the rear mount 22 complete the resilient support of the power plant 8 on the vehicle frame.

Left and right road wheels 26 and 28 are rotatably supported on wheel support members 30 and 32. A left upper suspension arm 34 is pivotally connected at its inner end to the left side rail 12 by a pivot bracket 36. The outer end of the upper arm 34 is connected to the left wheel support 30 by a ball joint assembly 31. A coil type suspension spring 38 is interposed between a spring seat formed in the arm 34 and a sheet metal member 40 extending from and rigidly connected to the left side rail 12.

The upper suspension arm arrangement for the right wheel 28 is generally similar. An upper arm 42 is pivotally connected to a frame bracket 44 at its inner end and to the wheel support 32 at its outer end by a ball joint assembly 45. A coil spring 46 is interposed between a spring seat on the suspension arm 42 and a sheet metal support 48 carried by the right side rail 14.

A lower left suspension arm 50 has its inner end pivotally supported by a bracket 52 that is welded or bolted to the engine 10. The outer end of the arm 50 is joined by a ball joint 53 to the wheel support 30. The lower suspension arm 50 is relatively narrow and serves to position the wheel 26 laterally with respect to the vehicle chassis. A drag strut 54 is provided to absorb longitudinal forces such as occurred during braking.

The drag strut 54 is riveted to the arm 50 at its outer end. The inner end of the drag strut 54 is connected to a frame bracket 56. The strut 54 is formed from bar stock and has its inner end threaded. The end of the strut 54 passes through an aperture in the bracket 56 and is located by a pair of rubber pucks 58 and a pair of nuts 59.

A frame cross member 60 interconnects the side rails 12, 14 at their forward ends and provides reinforcement for the frame bracket 56.

The lower suspension on the right-hand side is of identical construction. A lower arm 62 is connected to an engine bracket 63 at its inner end and to a ball joint assembly 64 carried by the right wheel support 32. The lower arm 62 is braced by a drag strut 66 extending diagonally between the outer end of the arm 62 and a frame bracket 68.

With this arrangement, the wheels 26, 28 with their support members 30, 32 are positioned by the upper and lower suspension arms 34, 42, 50, 62. While it is conventional to connect the upper and lower arms to a common supporting structure, this invention comprehends a novel arrangement in which relative movement is permitted between the brackets that support the inner ends of the upper and lower arms. In order to assure that the relative movement will not adversely affect the suspension or steering characteristics, it is restricted to a vertical direction. This is achieved by the special engine mounts illustrated in FIGURES 3 and 4.

FIGURE 3 discloses the construction of the forward engine mount 16 (mount 18 is identical). The frame member 12 has an inwardly extending bracket 70, while a bracket 72 extends outwardly from the engine 10 and overlaps the frame bracket 70. A pair of cup-shaped stamped metal pieces 74 and 76 are positioned above and beneath the extending engine bracket 72 and contain doughnut-shaped rubber members 78 and 80. A bolt 82 passes through the cup members 74, 76; rubber members 78, 80 and joins the engine bracket 72 with the frame bracket 70. The various parts are dimensioned so that resilient movement of the engine 10 with respect to the frame 12 is substantially restricted to a vertical direction parallel to the axis of the bolt 82.

In a similar fashion, the rear engine mount 22 of FIGURE 4 prevents significant horizontal movement but permits slight vertical displacement of a resilient nature between the transmission 20 and cross frame member 24.

The resilient mount of FIGURE 4 comprises a channel member 86 having depending side flanges 87. A second channel member 88 has upstanding flanges 89 positioned inwardly of flanges 87. A mass of rubber 91 is molded in place between the channel members 86, 88, including the spaces between the side flanges 87 and 89. The lower member 88 is secured to the cross frame member 24 by a bolt 90. The upper member 86 is secured to a transmission bracket 92 by a pair of bolts 93. Due to the relationship of the side flanges 87, 89 of the members 86 and 88, relative movement is restricted to a vertical direction. Any horizontal movement will be resisted by the compression loading of the rubber trapped between flanges.

The three engine mounts, comprising the two forward mounts 16, 18 and the rear mount 22, constitute the principal supporting connection between the power plant 8 and the chassis of the vehicle. These mounts have the common feature of resiliently supporting the power unit 8 for slight vertical displacement to isolate engine noises, but highly restricting any tendencies toward lateral movement. Because a portion of the suspension is supported on the engine 10, the resilient mounts 16, 18 and 22 also serve to isolate road noises. The special nature of the engine mounts provides the essential control needed to maintain proper paths for wheel movement.

The foregoing description presents the presently preferred embodiments of this invention. Alterations and modifications may occur to those skilled in the art that will come within the scope and spirit of the following claims.

I claim:

1. A vehicle having a chassis, a power plant resiliently supported on said chassis, left and right road wheels positioned on either side of said power plant, wheel support means rotatably supporting said road wheels, a first set of suspension arms pivotally connected at their outer ends to said wheel support means and pivotally connected at their inner ends on said chassis, a second set of suspension arms pivotally connected at their outer ends to said wheel support means and pivotally connected at their inner ends on said power plant, strut means interposed between each arm of said second set and said chassis and adapted to position said arms longitudinally of said vehicle.

2. A vehicle having a chassis, a power plant resiliently supported on said chassis, left and right road wheels positioned on either side of said power plant, wheel support means rotatably supporting said road wheels, a first set of suspension arms pivotally connected at their outer ends to said wheel support means and pivotally connected at their inner ends on said chassis, a second set of suspension arms pivotally connected at their outer ends to said wheel support means and pivotally connected at their inner ends on said power plant, spring means resiliently supporting said chassis on one of said set of arms.

3. A vehicle having a chassis, a power plant resiliently supported on said chassis, left and right road wheels positioned on either side of said power plant, wheel support means rotatably supporting said road wheels, a set of upper suspension arms pivotally connected at their outer ends to said wheel support means and pivotally connected at their inner ends on said chassis, a second set of lower suspension arms pivotally connected at their outer ends to said wheel support means and pivotally connected at their inner ends on said power plant, strut means interposed between each of said lower arms and said chassis and adapted to position each of said lower arms longitudinally of said vehicle.

4. A vehicle having a chassis, a power plant and mounting means supporting said power plant on said chassis, said mounting means being adapted to permit slight resilient vertical movement of said power plant with respect to said chassis while substantially preventing lateral movement of said power plant, left and right road wheels rotatably mounted on supporting members, said supporting members being positioned laterally of said power plant, a first set of suspension arms interconnecting said supporting members and said chassis, a second set of suspension arms interconnecting said supporting members and said power plant, strut means interposed between the arms of said second set and said chassis.

5. A vehicle having a chassis, a power plant and mounting means supporting said power plant on said chassis, said mounting means being adapted to permit slight resilient vertical movement of said power plant with respect to said chassis while substantially preventing lateral movement of said power plant, left and right road wheels and supporting members positioned laterally of said power plant, a set of upper suspension arms interconnecting said supporting members and said chassis, a set of lower suspension arms interconnecting said supporting members and said power plant, spring means resiliently supporting said chassis on said road wheels and supporting members.

6. A vehicle having a chassis, a power plant and mounting means supporting said power plant on said chassis, said mounting means being adapted to permit slight resilient vertical movement of said power plant with respect to said chassis while substantially preventing lateral movement of said power plant, left and right road wheels rotatably mounted on supporting members, said supporting members being positioned laterally of said power plant, a set of upper suspension arms interconnecting said supporting members and said chassis, a set of lower suspension arms interconnecting said supporting members and said power plant, a diagonally arranged drag strut secured to the outer end of each of said upper arms at one of its ends and resiliently connected to said chassis at the other of its ends, a suspension spring interposed between each of said upper arms and said chassis.

References Cited by the Examiner

UNITED STATES PATENTS

| | | | |
|---|---|---|---|
| 1,641,856 | 9/27 | Lloyd | 180—64 X |
| 1,976,701 | 10/34 | Trott | 180—64 |
| 2,155,750 | 4/39 | Best. | |
| 2,159,332 | 5/39 | Lee | 180—54 X |
| 2,776,721 | 1/57 | Giacosa | 180—64 X |
| 3,079,137 | 2/63 | Schilberg | 280—96.2 X |
| 3,089,559 | 5/63 | Rieck | 180—64 |
| 3,139,275 | 6/64 | Burkitt | 280—96.2 X |

FOREIGN PATENTS

| | | |
|---|---|---|
| 919,929 | 11/54 | Germany. |
| 1,130,304 | 5/62 | Germany. |
| 894,131 | 4/62 | Great Britain. |

MILTON BUCHLER, *Primary Examiner.*

KENNETH H. BETTS, *Examiner.*